(12) United States Patent
Yen et al.

(10) Patent No.: US 7,724,220 B2
(45) Date of Patent: May 25, 2010

(54) DRIVING SYSTEM OF LIGHT EMITTING DIODE

(75) Inventors: Cheng-Chi Yen, Tainan (TW); Yung-Yuan Ho, Tainan (TW); Yen-Chen Chen, Tainan (TW)

(73) Assignee: Himax Display, Inc., Tainan County (TW)

( * ) Notice: Subject to any disclaimer, the term of this patent is extended or adjusted under 35 U.S.C. 154(b) by 710 days.

(21) Appl. No.: 11/651,539

(22) Filed: Jan. 10, 2007

(65) Prior Publication Data
US 2007/0159434 A1    Jul. 12, 2007

(30) Foreign Application Priority Data
Jan. 12, 2006    (TW) ................................ 95101143 A (51) Int. Cl.
*G09G 3/32*    (2006.01)
(52) U.S. Cl. ............................. 345/83; 345/46; 345/82; 345/211; 313/504; 315/167; 315/169.1
(58) Field of Classification Search .................. 345/39, 345/44–46, 76–83, 204.98–100, 211–214; 315/169.1–169.3, 167, 170
See application file for complete search history.

(56) References Cited

U.S. PATENT DOCUMENTS

| | | | |
|---|---|---|---|
| 6,332,661 B1 | 12/2001 | Yamaguchi | |
| 7,218,315 B2 | 5/2007 | Takeuchi et al. | |
| 7,391,406 B2 * | 6/2008 | Yamamoto et al. | 345/102 |
| 7,570,244 B2 * | 8/2009 | Agari et al. | 345/100 |
| 2003/0048397 A1 | 3/2003 | Hung et al. | |
| 2004/0017537 A1 | 1/2004 | Magana et al. | |
| 2005/0057554 A1 * | 3/2005 | Yamamoto et al. | 345/211 |

FOREIGN PATENT DOCUMENTS

| | | |
|---|---|---|
| CN | 2593234 Y | 12/2003 |
| TW | 505965 | 10/2002 |
| TW | 200303686 A | 9/2003 |

* cited by examiner

*Primary Examiner*—Richard Hjerpe
*Assistant Examiner*—Jennifer T Nguyen
(74) *Attorney, Agent, or Firm*—Volentine & Whitt, PLLC (57) ABSTRACT

The invention relates to an LED current driving system. The LED current driving system comprises an LED driver. The LED driver comprises at least one LED driving unit for outputting a driving current to an LED. Each LED driving unit comprises a plurality of current sources and a plurality of switches. The switches are connected to the corresponding current source. Each switch controls the ON/OFF state of the corresponding current source in accordance with the duty cycle control signal and a current control signal. Therefore, by integrating the LED driver on the LCOS panel, the LED current driving system of the invention can decrease the pin number of the LCOS chip, the overall area and the system cost so as to improve the yield of the LED current driving system. Besides, the LED current driving system utilizes the current sources to form the driving current to stably and precisely control the driving current flowing through the corresponding LED so that the color quality of the image can be improved.

12 Claims, 7 Drawing Sheets

DRIVING SYSTEM OF LIGHT EMITTING DIODE

BACKGROUND OF THE INVENTION

1. Field of the Invention

The present invention relates to an LED (light emitting diode) current driving system. Particularly, the present invention relates to an LED current driving system for an LCOS (liquid crystal on silicon) display.

2. Description of the Prior Art

Figure 1A:
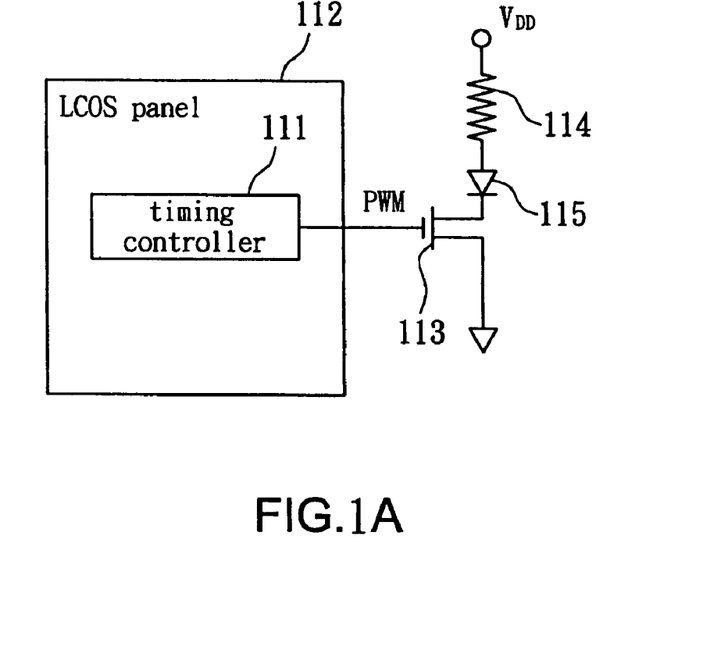
FIGS. 1A and 1B are schematic views of a conventional LED current driving system for an LCOS display.
Figure 1B:
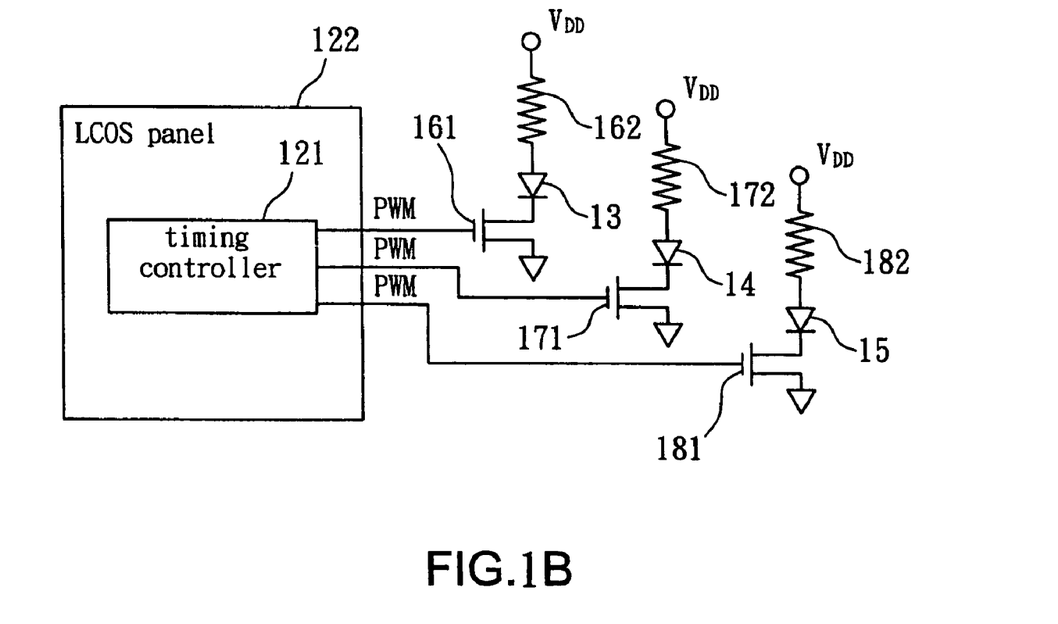

Referring to FIGS. 1A and 1B, schematic views of a conventional LED current driving system for an LCOS display are shown. Firstly, referring to FIG. 1A, the conventional LED current driving system 11 includes a timing controller 111, an LCOS panel 112, a transistor 113, and a resistor 114. The conventional LED current driving system 11 is used to control the current of a LED 115. The timing controller 111 is mounted on the LCOS panel 112 for providing a PWM (pulse width modulation) signal to the transistor 113 to control whether the transistor 113 is conducted. According to the ON/OFF states time of the transistor, the magnitude of the current flowing through the LED 115 is controlled.

Referring to FIG. 1B, the conventional LED current driving system 12 is applied in a color sequential LCOS display. The LED current driving system 12 includes a timing controller 121, an LCOS panel 122, three transistors 161, 171, 181, and three resistors 162, 172, 182. The conventional LED current driving system 12 is used to control the currents of three LEDs (red, green, and blue LEDs) 13, 14, 15. The timing controller 121 in addition to providing a PWM signal to the transistors 161, 171, 181 also provides the ON/OFF timing, so that three LEDs 13, 14, 15 can be conducted sequentially to achieve a color sequential control.

The conventional LED current driving system does not integrate all the elements, so the pin number of the LCOS chip, the overall area, and the system cost are increased. Moreover, as the integration is not satisfied, the yield of the LED current driving system may be affected. Besides, the conventional LED current driving system cannot stably and precisely control the current flowing through the LED, so that the color quality is poor.

Therefore, it is necessary to provide an LED current driving system, so as to solve the above problems.

SUMMARY OF THE INVENTION

The objective of the present invention is to provide an LED current driving system. The LED current driving system comprises a timing controller, and an LED driver. The timing controller is used to provide at least one duty cycle control signal. The LED driver is coupled to the timing controller and has at least one LED driving unit for outputting a driving current to an LED. Each LED driving unit has a plurality of current sources and a plurality of switches. The switches are connected to the corresponding current source. Each switch controls the ON/OFF state of the corresponding current source in accordance with the duty cycle control signal and a current control signal.

Another objective of the present invention is to provide an LED driver. The LED driver has at least one LED driving unit for driving an LED. Each LED driving unit has a plurality of current sources and a plurality of switches. The switches are connected to the current sources respectively. Each switch controls the ON/OFF state of the corresponding current source in accordance with a current control signal.

Still another objective of the present invention is to provide an LED driver. The LED driver comprises at least one LED driving unit. The LED driving unit comprises a reference current source generator and an output current source. The reference current source generator is used for outputting a reference current in accordance with a plurality of current control signals. The output current source is used for outputting a driving current in accordance with the reference current.

Therefore, the LED current driving system of the present invention integrates the LED driver on the LCOS panel, so as to reduce the pin number of the LCOS chip, the overall area, and the system cost, and to improve the yield of the LED current driving system of the present invention. Besides, the LED current driving system of the present invention uses the current sources which are combined into the driving current, so as to stably and precisely control the current flowing through the corresponding LED, and to improve the color quality of the image.

DETAILED DESCRIPTION

Figure 2:
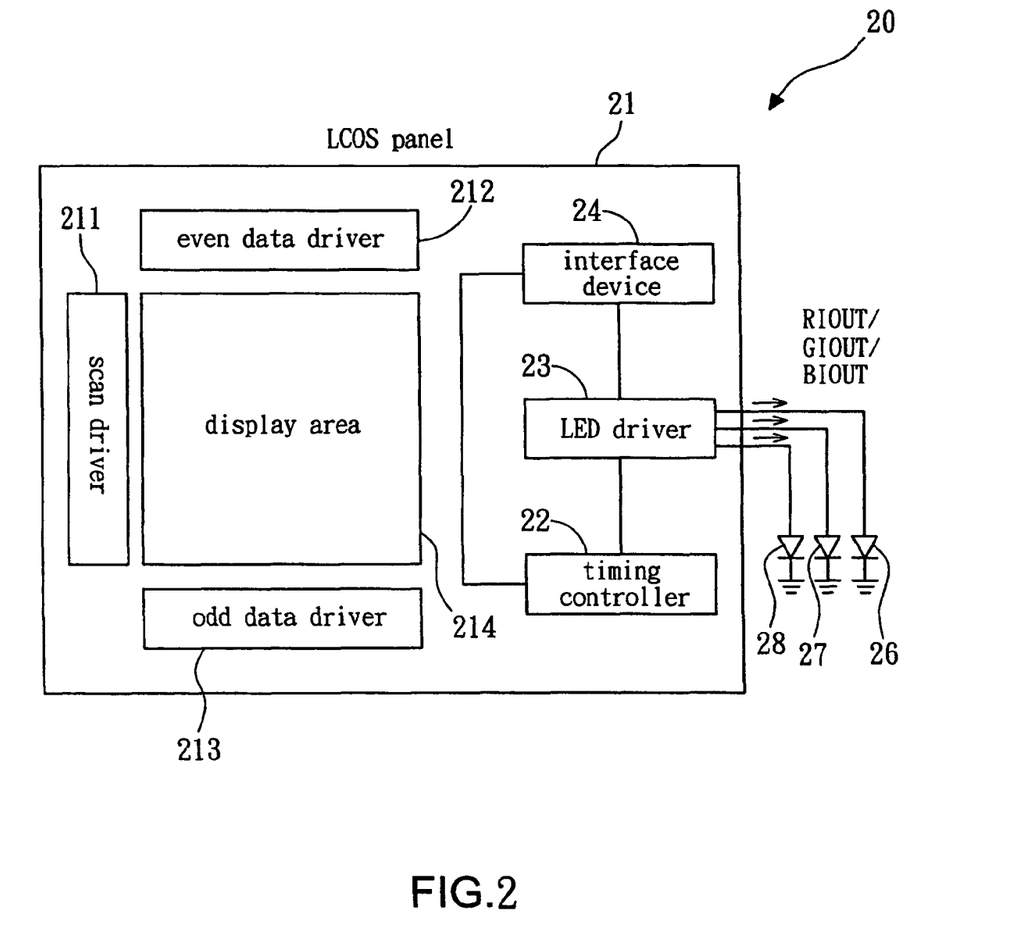
FIG. 2 is a schematic view of the LED current driving system according to the present invention.

Referring to FIG. 2, a schematic view of the LED current driving system according to the present invention is shown. The LED current driving system 20 for an LCOS display according to the present invention comprises an LCOS panel 21, a timing controller 22, an LED driver 23, and an interface device 24. The timing controller 22, the LED driver 23, and the interface device 24 are integrated on the LCOS panel 21 for providing the driving current to the LEDs (red, green, and blue LEDs) 26, 27, 28. The LED current driving system of the present invention integrates the LED driver on the LCOS panel, so as to reduce the pin number of the LCOS chip, the overall area, and the system cost, and to improve the yield of the LED current driving system of the present invention.

The LCOS panel 21 further comprises a scan driver 211, an even data driver 212, an odd data driver 213, and a display area 214. The LCOS panel 21 is used to receive the image data to display image.

Figure 3:
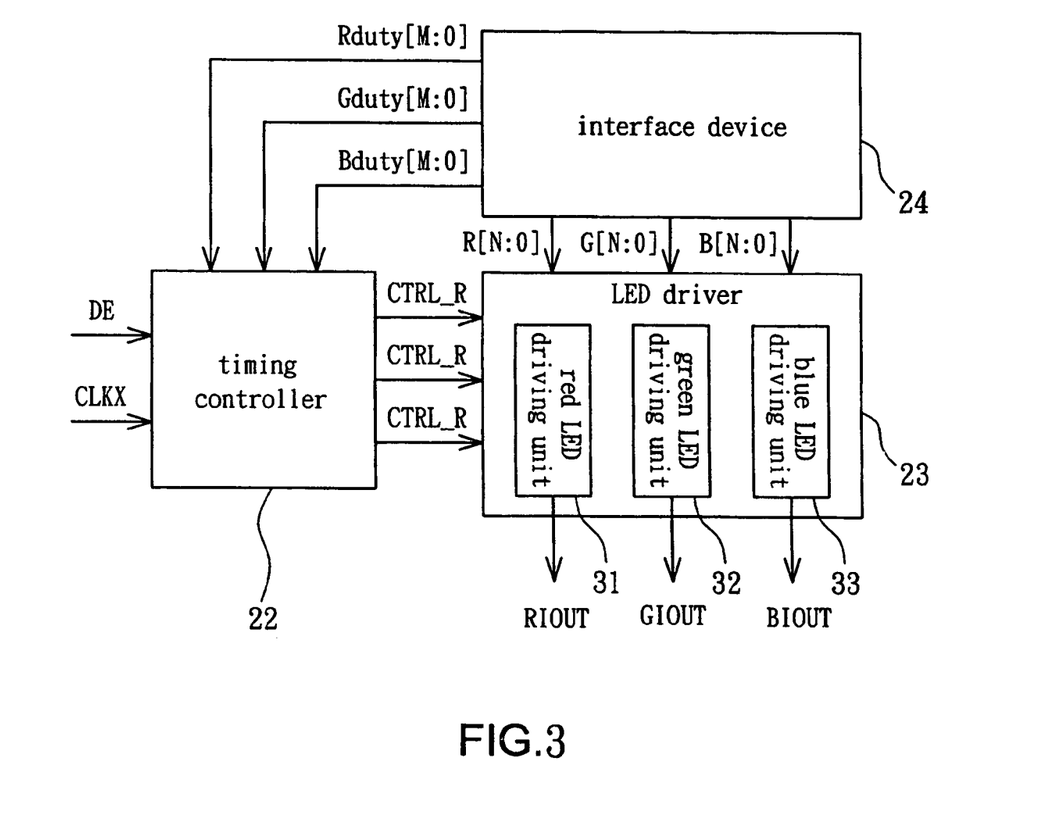
FIG. 3 is a schematic view of the relation of the control signal of the LED current driving system according to the present invention.

Referring to FIG. 3, a schematic view of the relation of the control signals of the timing controller 22, the LED driver 23, and the interface device 24 of FIG. 2 is shown. In this embodiment, the interface device 24 is a serial interface, for example, an I²C interface, but it is not limited to this and can also be a parallel interface. The interface device 24 is used to register data and transmit the data to the timing controller 22 and the LED driver 23.

The interface device 24 provides duty cycle signals Rduty[M:0], Gduty[M:0], and Rduty[M:0] to the timing controller 22. According to the duty cycle signals and the input clock signal CLKX, the timing controller 22 is used to provide at least one duty cycle control signal CTRL_R, CTRL_G, CTRL_B to the LED driver 23 to control the ON/OFF timing and the ON/OFF duty cycle of the LEDs 26, 27, 28.

The LED driver 23 is coupled to the timing controller 22 to receive the duty cycle control signals CTRL_R, CTRL_G, CTRL_B from the timing controller 22. Also, the LED driver 23 is coupled to the interface device 24 to receive the current control signals R[N:0], G[N:0], B[N:0] from the interface device 24. The LED driver 23 has at least one LED driving unit. In this embodiment, the LED driver 23 has three LED driving units comprising a red LED driving unit 31, a green LED driving unit 32, and a blue LED driving unit 33. Each LED driving unit outputs a driving current to a corresponding LED. For example, the red LED driving unit 31 outputs a driving current RIOUT to the corresponding red LED 26 (FIG. 2), the green LED driving unit 32 outputs a driving current GIOUT to the corresponding green LED 27 (FIG. 2), and the blue LED driving unit 33 outputs a driving current BIOUT to the corresponding blue LED 28 (FIG. 2).

Figure 4:
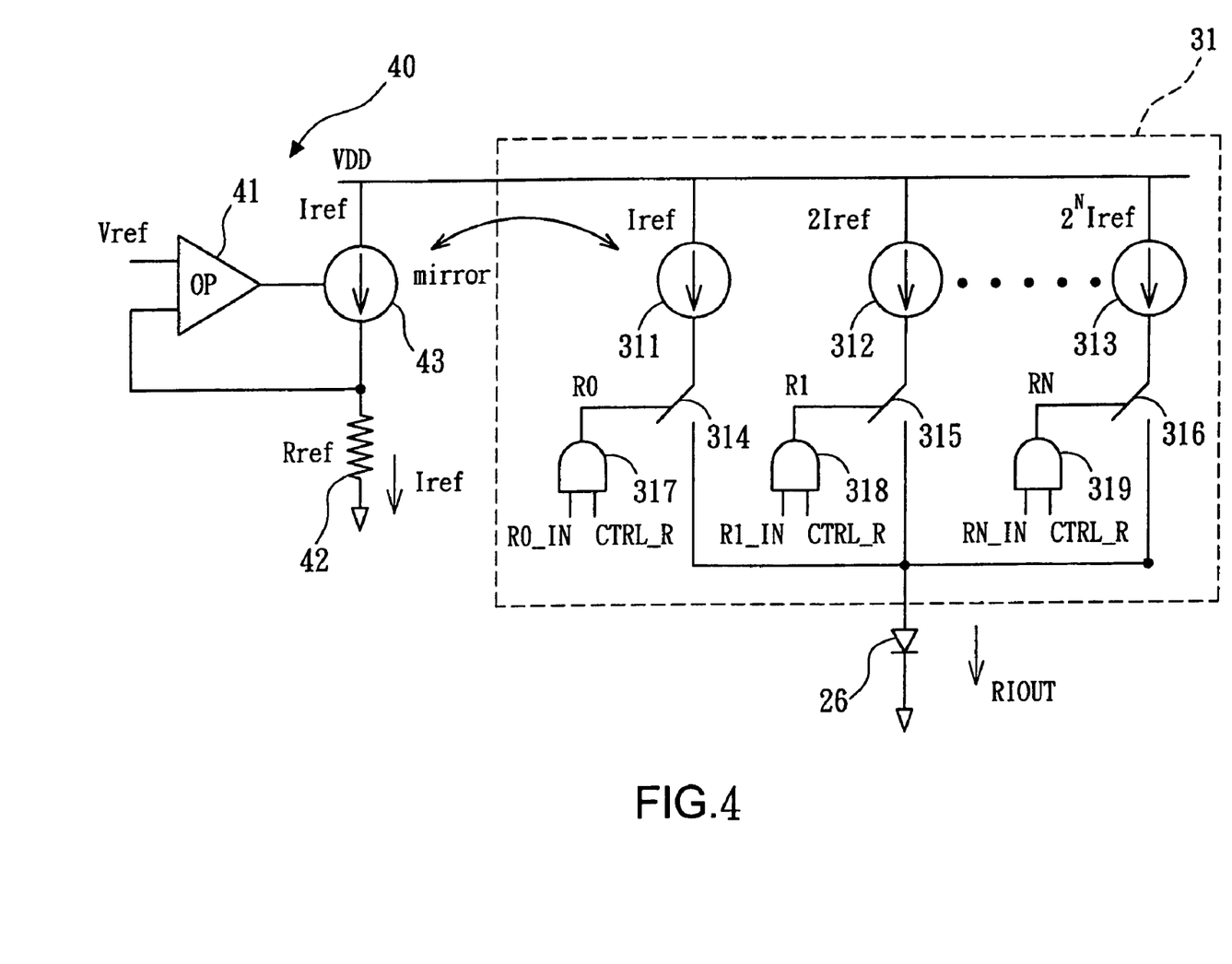
FIG. 4 is a schematic view of the circuit of the LED driving unit according to the present invention.

Referring to FIG. 4, a schematic view of the circuit of the LED driving unit according to the present invention is shown. Each LED driving unit of the present invention has a plurality of current sources and a plurality of switches. The red LED driving unit 31 of FIG. 3 is taken as an example for illustration. The red LED driving unit 31 has a plurality of current sources 311, 312, 313 and a plurality of switches 314, 315, 316. The switches 314, 315, 316 are respectively connected to the corresponding current sources 311, 312, 313 for controlling the magnitude of the driving current RIOUT output from the current sources 311, 312, 313.

The magnitude of the current of the current sources 311, 312, 313 is $2^N$ times a reference current Iref, where N is 0 or a positive integer. For example, the magnitude of the current of the first current source 311 is equal to the reference current Iref, i.e. N is equal to 0. The magnitude of the current of the second current source 312 is equal to twice the reference current 2*Iref, i.e. N is equal to 1. The magnitude of the current of the $(N+1)^{th}$ current source 313 is equal to $2^N$ times the reference current $2^N$*Iref. The reference current Iref is generated by a reference current source generator 40, and is mapped to the current sources by a current mirror.

The reference current source generator 40 comprises an operational amplifier 41, a reference resistor (Rref) 42, and a reference current source 43. The reference resistor 42 is coupled to an input terminal of the operational amplifier 41, and another input terminal of the operational amplifier 41 is coupled to a reference power source Vref. Therefore, the current flowing through the reference resistor 42 is Vref/Rref, i.e. the reference current Iref. The reference current source 43 provides the reference current Iref which is mapped to the current sources 311, 312, 313 by the current mirror.

The switches 314, 315, 316 are controlled by a plurality of logic gates 317, 318, 319. For example, the first AND logic gate 317 is used to control the first switch 314. The input of each logic gate is coupled to the duty cycle control signal CTRL_R and the corresponding current control signals R0_IN, R1_IN, RN_IN respectively. For example, two inputs of the first AND logic gate 317 are the duty cycle control signal CTRL_R and the corresponding current control signal R0_IN, and the output of the first AND logic gate 317 is R0.

Two inputs of the second AND logic gate 318 are the duty cycle control signal CTRL_R and the corresponding current control signal R1_IN, and the output of the second AND logic gate 318 is R1. Two inputs of the $(N+1)^{th}$ AND logic gate 319 are the duty cycle control signal CTRL_R and the corresponding current control signal RN_IN, and the output of the $(N+1)^{th}$ AND logic gate 319 is RN.

As far as the first AND logic gate 317 is concerned, when the corresponding current control signal R0_IN is at a high voltage level (H), and the duty cycle control signal CTRL_R is also at a high voltage level (H), the output of the first AND logic gate 317 is at the high voltage level (H), and the corresponding first switch 314 is conducted, so as to provide the reference current Iref of the corresponding first current source 311 to the driving current RIOUT. If the duty cycle control is not required, the duty cycle control signal CTRL_R and the first to $(N+1)^{th}$ AND logic gates can be omitted, and the current control signals R0_IN-RN_IN are used as R0-RN to control the switches 314, 315, 316. Therefore, the driving current RIOUT includes the current provided by the first current source 311 to the $(N+1)^{th}$ current source 313, so that the driving current RIOUT can be precisely controlled between 0 to $2^{N+1}-1$ times the reference current Iref, i.e., the driving current RIOUT can be controlled between 0*Iref to $(2^{N+1}-1)$*Iref. Accordingly, the current flowing through the corresponding LED 26 can be stably and precisely controlled, so that the color quality of the image is improved.

Figure 5:
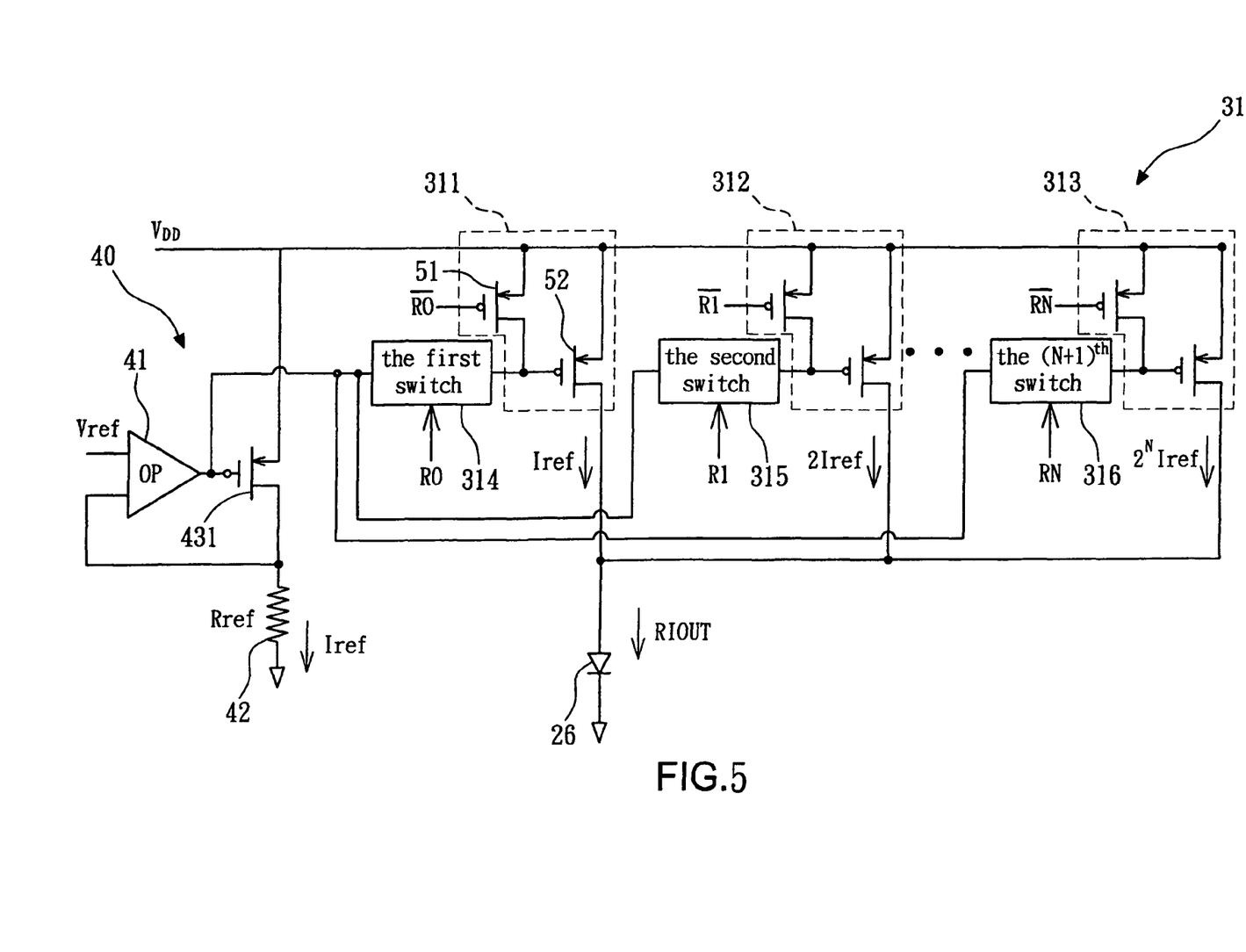
FIG. 5 is a schematic view of the circuit of the LED driving unit according to the first embodiment of the present invention.

Referring to FIG. 5, a schematic view of an embodiment of the circuit of the LED driving unit according to the first embodiment of the present invention is shown. Similarly, the red LED driving unit 31 of FIG. 3 is taken as an example for illustration. The circuit of the red LED driving unit 31 comprises a reference current source generator 40, a plurality of current sources 311, 312, 313, and a plurality of switches 314, 315, 316. The reference current source generator 40 comprises an operational amplifier 41, a reference resistor 42, and a reference PMOS transistor 431. The connection relation of the operational amplifier 41 and the reference resistor 42 can refer to the illustration of FIG. 4. The reference PMOS transistor 431 is coupled to an output terminal of the operational amplifier 41, the reference resistor 42, and an external power source VDD.

The first current source 311 comprises a first PMOS transistor 51 and a second PMOS transistor 52. The first PMOS transistor 51 is coupled to the external power source VDD, and the second PMOS transistor 52 is coupled to the external power source VDD, the first PMOS transistor 51, and the corresponding red LED 26. The second PMOS transistor 52 is coupled to the reference current source generator 40 for providing the reference current to the LED. By the control of the first switch 314, the first current source 311 can provide the reference current Iref to the corresponding LED 26. The first switch 314 is controlled by the output R0 of the first AND logic gate 317. However, it should be noted that similar to the illustration of FIG. 4, if the duty cycle control is not required, the first switch 314 can be controlled by only the R0_IN. The gate of the first PMOS transistor 51 is controlled by the inversion signal of the output of the first AND logic gate 317. The internal circuits of the current sources 312 and 313 can be obtained with reference to the current source 311, and the details will not be described herein again.

Similarly, the current source having $2^N$ times the reference current is used to provide $2^N$ times the reference current to the corresponding LED 26. For example, the second current source 312 provides twice the reference current (2*Iref) to the corresponding LED 26. The $(N+1)^{th}$ current source 313 provides $2^N$ times the reference current ($2^N$*Iref) to the corresponding LED 26. Therefore, the current flowing through the corresponding LED 26 can be stably and precisely controlled, so that the color quality of the image is improved.

Figure 6:
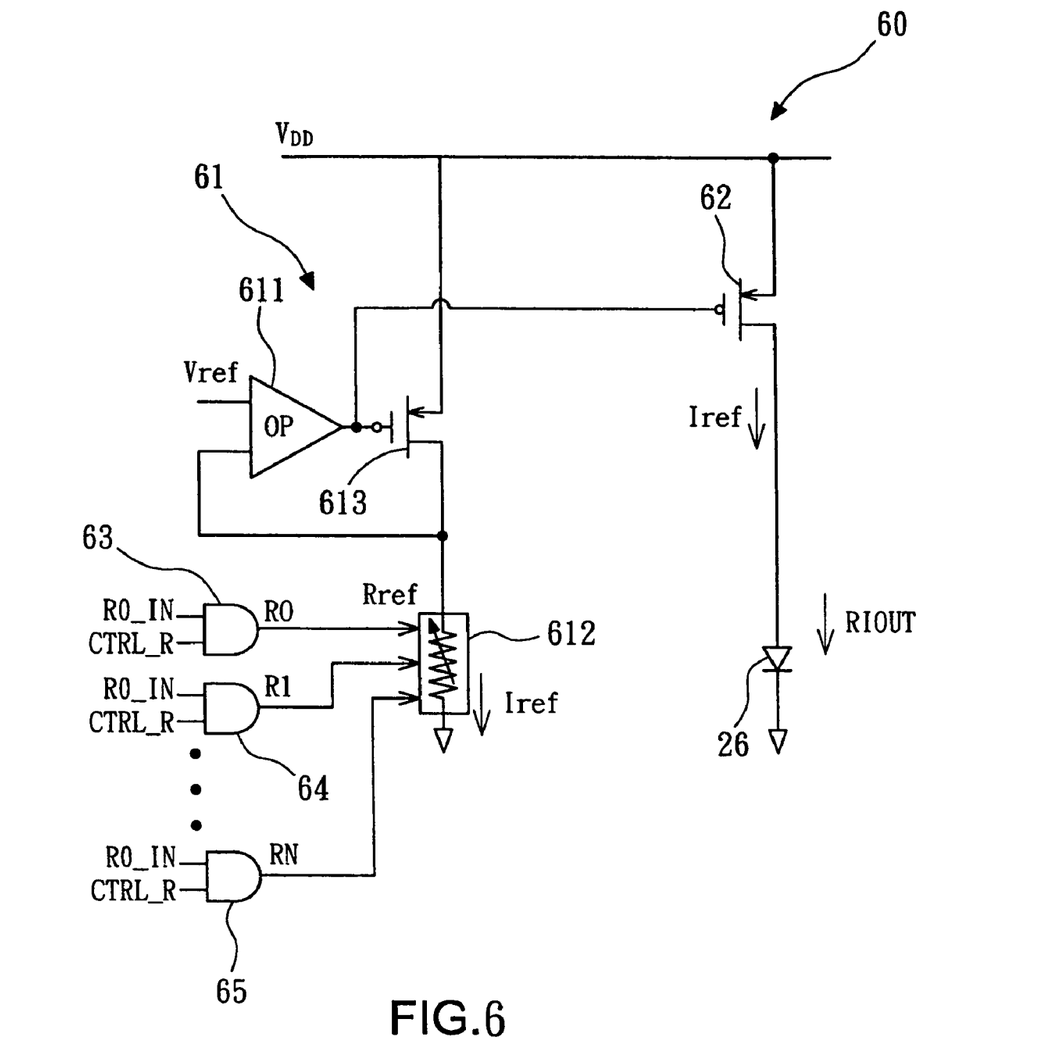
FIG. 6 is a schematic view of the circuit of the LED driving unit according to the second embodiment of the present invention.

Referring to FIG. 6, a schematic view of an embodiment of the circuit of the LED driving unit according to the second embodiment of the present invention is shown. Similarly, the red LED driving unit 31 of FIG. 3 is taken as an example for illustration. The circuit of the red LED driving unit 60 of the second embodiment comprises a reference current source generator 61 and an output current source 62. The reference current source generator 61 comprises an operational amplifier 611, a reference resistor 612, and a reference PMOS transistor 613. The connection relation of the operational amplifier 611, the reference resistor 612, and the reference PMOS transistor 613 can refer to the illustration of FIG. 5.

The reference resistor 612 may be an electronic rheostat, and the resistance value thereof is controlled according to the outputs R0, R1, RN of the plurality of logic gates 63, 64, 65. The input of each logic gate is coupled to the duty cycle control signal CTRL_R and the corresponding current control signals R0_IN, R1_IN, RN_IN respectively. For example, two inputs of the first AND logic gate 63 are the duty cycle control signal CTRL_R and the corresponding current control signal R0_IN, and the output of the first AND logic gate 63 is R0. Two inputs of the second AND logic gate 64 are the duty cycle control signal CTRL_R and the corresponding current control signal R1_IN, and the output of the second AND logic gate 64 is R1. Two inputs of the $(N+1)^{th}$ AND logic gate 65 are the duty cycle control signal CTRL_R and the corresponding current control signal RN_IN, and the output of the $(N+1)^{th}$ AND logic gate 65 is RN.

The first AND logic gate 63 is taken as an example for illustration, when the corresponding current control signal R0_IN is at a high voltage level (H), and the duty cycle control signal CTRL_R is also at a high voltage level (H), the output R0 of the first AND logic gate 63 is at the high voltage level (H). Therefore, according to the corresponding current control signal and the duty cycle control signal, the resistance value of the reference resistor 612 is adjusted to control the reference current Iref. If the duty cycle control is not required, the duty cycle control signal CTRL_R and the logic gates 63, 64, 65 can be omitted, and the current control signals R0_IN-RN_IN are used as R0-RN to adjust the resistance value of the reference resistor 612 to control the reference current Iref.

The reference current Iref is mapped to the output current source 62 via the current mirror, and the mapping ratio may be adjusted. In this embodiment, the mapping ratio is, for example, 1. The output current source 62 is a PMOS transistor. The output current source 62 is coupled to the external power source VDD, the reference PMOS transistor 613, and the corresponding red LED 26. The output current source 62 provides a driving current RIOUT to the corresponding red LED 26. In this embodiment, as the mapping ratio is 1, the driving current RIOUT is equal to the reference current Iref.

Therefore, the resistance value of the reference resistor can be controlled according to the corresponding current control signal and the duty cycle control signal. The magnitude of the reference current is controlled according to the reference resistor. According to the mapping ratio, the driving current RIOUT is controlled to stably and precisely control the current flowing through the corresponding LED 26, so that the color quality of the image is improved.

Figure 7:
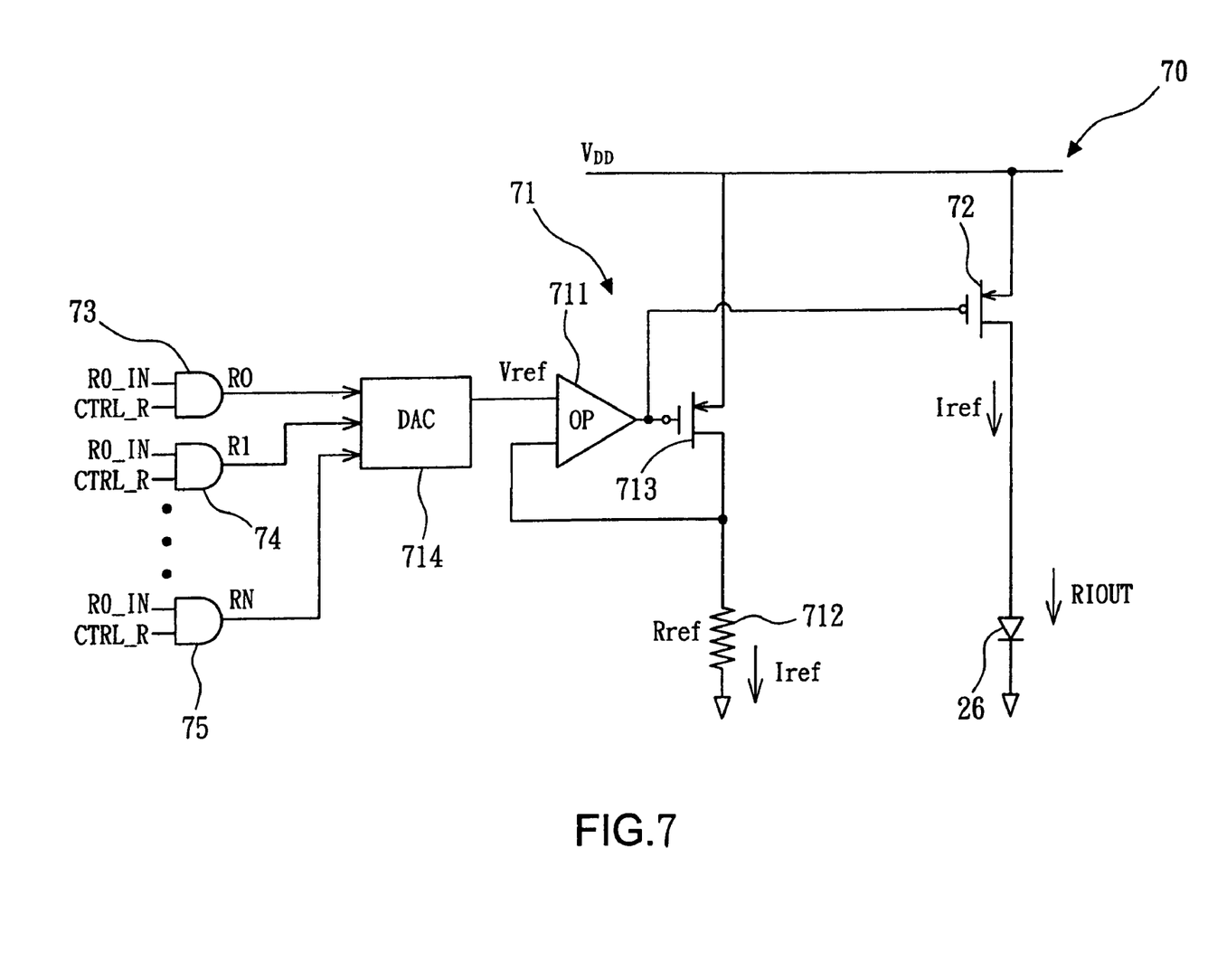
FIG. 7 is a schematic view of the circuit of the LED driving unit according to the third embodiment of the present invention.

Referring to FIG. 7, a schematic view of an embodiment of the circuit of the LED driving unit according to the third embodiment of the present invention is shown. Similarly, the red LED driving unit 31 of FIG. 3 is taken as an example for illustration. The circuit of the red LED driving unit 70 of the third embodiment comprises a reference current source generator 71 and an output current source 72. The reference current source generator 71 comprises an operational amplifier 711, a reference resistor 712, and a reference PMOS transistor 713. The connection relation of the operational amplifier 711, the reference resistor 712, and the reference PMOS transistor 713 can refer to the illustration of FIG. 5.

The difference of the reference current source generator 71 of the third embodiment and the reference current source generator 61 of the second embodiment lies in that the reference current source generator 71 further includes a digital-to-analog converter (DAC) 714 for controlling the voltage value of the reference power source. The voltage value of the reference power source is controlled according to the outputs R0, R1, RN of the plurality of logic gates 73, 74, 75. The input of each logic gate is coupled to the duty cycle control signal CTRL_R and the corresponding current control signals R0_IN, R1_IN, RN_IN respectively. The operation of the logic gates 73, 74, 75 is substantially the same as that of the logic gates 63, 64, 65 of FIG. 6. The DAC 714 is used to convert the digital outputs R0, R1, RN of the logic gates 73, 74, 75 to the analog voltage values. If the duty cycle control is not required, the duty cycle control signal CTRL_R and the logic gates 73, 74, 75 can be omitted, and the current control signals R0_IN-RN_IN are used as R0-RN to be converted to the analog voltage values, so as to control the voltage value of the reference power source.

Therefore, the voltage value of the reference power source is controlled according to the corresponding current control signal and the duty cycle control signal. The magnitude of the reference current is controlled according to the reference power source. According to the mapping ratio, the driving current RIOUT is controlled to stably and precisely control the current flowing through the corresponding LED 26, so that the color quality of the image is improved.

Referring to FIG. 2, in the above embodiment of the LED current driving system of the present invention, the color sequential LCOS display is taken as an example for illustration, so the timing controller 22 in addition to providing a duty cycle control signal to the LED driver 23 also provides the ON/OFF timing, so that three LEDs 26, 27, 28 can be conducted sequentially to achieve the color sequential control. However, the LED current driving system of the present invention is not limited to be applied in the color sequential LCOS display, and can also be applied in the LCOS display having the color filter. If the LED current driving system of the present invention is applied in the LCOS display having the color filter, the timing controller is not required, and the logic gates are also not required. The current control signals are directly used to control the ON/OFF states of the switches, and to stably and precisely control the current flowing through the corresponding LED, so that the color quality of the image is improved.

While several embodiments of the present invention have been illustrated and described, various modifications and improvements can be made by those skilled in the art. It is to be noted that the LED current driving system of the present invention is described in detail based on the LCOS display. It is to be understood that the LED current driving system of the invention is not limited to the LCOS but also other displays such as LCD for example. The embodiment of the present invention is therefore described in an illustrative, but not restrictive, sense. It is intended that the present invention may not be limited to the particular forms as illustrated, and that all modifications which maintain the spirit and scope of the present invention are within the scope as defined in the appended claims.

What is claimed is:

1. An LED current driving system, comprising:
   a timing controller, for providing at least one duty cycle control signal; and
   an LED driver, coupled to the timing controller and having at least one LED driving unit for outputting a driving current to an LED, each LED driving unit having a plurality of current sources and a plurality of switches connected thereto respectively, each switch controlling the ON/OFF state of the corresponding current source in accordance with the duty cycle control signal and a current control signal,
   wherein the magnitude of the current of each current source is $2^N$ times a reference current, where N is 0 or a positive integer, and
   wherein the current sources comprise a first current source, a second current source, and an $(N+1)^{th}$ current source, the current of the first current source is the reference current, the current of the second current source is twice the reference current, and the current of the $(N+1)^{th}$ current source is $2^N$ times the reference current.

2. The LED current driving system as claimed in claim 1, wherein the LED driver has a red LED driving unit, a green LED driving unit, and a blue LED driving unit for driving a red LED, a green LED, and a blue LED respectively.

3. The LED current driving system as claimed in claim 1, further comprising a plurality of logic gates for controlling the switches in accordance with the duty cycle control signal and the current control signals respectively.

4. The LED current driving system as claimed in claim 1, further comprising an interface device for providing the current control signals to the LED driver.

5. An LED driver, comprising:
   at least one LED driving unit for driving an LED, each LED driving unit comprising:
   a plurality of current sources; and
   a plurality of switches connected to the current sources respectively, each switch controlling the ON/OFF state of the corresponding current source according to a current control signal,
   wherein the magnitude of the current of each current source is $2^N$ times a reference current, where N is 0 or a positive integer, and
   wherein the current sources comprise a first current source, a second current source, and an $(N+1)^{th}$ current source, the current of the first current source is the reference current, the current of the second current source is twice the reference current, and the current of the $(N+1)^{th}$ current source is $2^N$ times the reference current.

6. The LED driver as claimed in claim 5, further comprising a red LED driving unit, a green LED driving unit, and a blue LED driving unit for driving the a red LED, a green LED, and a blue LED respectively.

7. The LED driver as claimed in claim 5, further comprising a reference current source generator for generating the reference current.

8. The LED driver as claimed in claim 7, wherein the reference current source generator comprises an operational amplifier, a reference resistor, and a reference PMOS transistor, wherein the reference resistor is coupled to an input terminal of the operational amplifier, another input terminal of the operational amplifier is coupled to a reference power source, the reference PMOS transistor is coupled to an output terminal of the operational amplifier, the reference resistor and an external power source.

9. The LED driver as claimed in claim 5, wherein each current source comprises a first PMOS transistor and a second PMOS transistor, the first PMOS transistor is coupled to the external power source, the second PMOS transistor is coupled to the external power source, the first PMOS transistor, and the LED, the second PMOS transistor is coupled to the reference current source generator for providing the reference current to the LED.

10. The LED driver as claimed in claim 5, further comprising an interface device for providing the current control signals to the LED driver.

11. An LED driver comprising:
    at least one LED driving unit comprising:
    a plurality of current sources outputting a a plurality of current sources in accordance with a plurality of current control signals; and
    an output current source outputting a driving current in accordance with the currents output by the plurality of current sources,
    wherein the magnitude of the current of each current source is $2^N$ times a reference current, where N is 0 or a positive integer, and
    wherein the current sources comprise a first current source, a second current source, and an $(N+1)^{th}$ current source, the current of the first current source is the reference current, the current of the second current source is twice the reference current, and the current of the $(N+1)^{th}$ current source is $2^N$ times the reference current.

12. The LED driver as claimed in claim 11, further comprising a red LED driving unit, a green LED driving unit, and a blue LED driving unit for driving the a corresponding red LED, a green LED, and a blue LED respectively.

* * * * *